3,215,636
PROCESS FOR SUBSTANTIALLY PREVENTING THE FORMATION OF FOAM
Walter Hagge, Leverkusen, Günther Boehmke, Cologne-Flittard, and Hans Geffers and Mathieu Quaedvlieg, Leverkusen, Germany, assignors to Farbenfabriken Bayer Aktiengesellschaft, Leverkusen, Germany, a corporation of Germany
No Drawing. Filed Nov. 28, 1961, Ser. No. 155,482
Claims priority, application Germany, Dec. 1, 1960, F 32,670
5 Claims. (Cl. 252—321)

The present invention relates to a process for substantially preventing the formation of foam; more particularly it concerns a process wherein surface active polyglycol ethers of saccharides are incorporated into an aqueous medium liable to foaming.

Polyglycol ethers of saccharides to be used according to the present invention can be obtained by causing alkylene oxides such as ethylene oxide, propylene oxides and/or butylene oxides, to react with saccharides, particularly oligosaccharides such as saccharose, galactose, maltose and raffinose, at temperatures of about 100–130° C. in the presence of alkaline reacting catalysts, for instance potassium hydroxide, sodium hydroxide and sodium methylate.

The molecular proportion between the alkylene oxides and the saccharides may vary within wide limits; in general the proportion is between 8:1 and 200:1.

The amount of the surface active polyglycol ethers of saccharides necessary for substantially preventing the formation of foam can easily be determined by preliminary tests.

If desired the surface active polyglycol ethers of saccharides can be combined with other surface active compounds which may be used for inhibiting the formation of foam; the combination with surface active polyglycol ethers of alkylphenols has proved to be particularly effective. Optimum proportions of the components in such combinations can also be easily determined by preliminary tests.

By applying surface active polyglycol ethers of saccharides it is possible to substantially prevent the formation of foams of various kinds, such as they occur, for instance, in the sugar industry, in the concentration of animal glue, in the treatment of milk or fish albumen, in the paper manufacture, in the working up of wood decomposition products as well as in the cleaning of beer bottles or the like.

The following examples serve to illustrate the present invention without, however, limiting the scope thereof; the parts given are parts by weight.

*Example 1*

One part of the polyglycol ether of saccharose described below is added to 10,000 parts of an aqueous lye which serves for cleaning milk bottles and is prepared in the usual manner from sodium hydroxide, alkali metal phosphates and alkali metal silicates. The cleaning of the bottles is substantially not accompanied with foam formation.

The polyglycol ether of saccharose is obtained by reacting propylene oxide with saccharose in the molecular ratio of 80:1 in an autoclave at 130° C. in the presence of 1% by weight of potassium hydroxide calculated on the weight of the saccharose.

*Example 2*

One part of the polyglycol ether of saccharose described in Example 1 is added to 10,000 parts of an aqueous lye prepared from sodium hydroxide, alkali metal phosphates and alkali metal silicates. This cleaning solution is fed to an automatic apparatus for cleaning bottles from residues of beer and glue used for fixing labels.

After some time foam has formed in a layer of about 2–3 cm. If instead of one part of the polyglycol ether of saccharose, one part of a mixture of 0.8 part of the polyglycol ether of saccharose and 0.2 part of a polyglycol ether of nonylphenol containing about 7 $C_2H_4O$ groups is added to 10,000 parts of the above aqueous lye, any foam formation does not occur at all.

This effect is particularly surprising since the foam inhibiting action of the polyglycol ether of nonylphenol used is substantially inferior to that of the polyglycol ether of saccharose; if one part of the nonylphenolpolyglycol ether is used alone, foam is formed in a layer of 15 cm.

We claim:
1. A process for substantially preventing the formation of foam in an aqueous medium liable to forming foam which consists in incorporating into the aqueous medium an active amount of the reaction product of
   (1) a member selected from the group consisting of ethylene oxide, propylene oxide and butylene oxide with
   (2) an oligosaccharide selected from the group consisting of saccharose, galactose, maltose and raffinose at a molecular ratio of about 8–200:1.
2. The process of claim 1 wherein the reaction product is obtained at a temperature of about 100°–130° C. in the presence of an active amount of an alkaline catalyst selected from the group consisting of potassium hydroxide, sodium hydroxide and sodium methylate.
3. The process of claim 1 wherein the reaction product of the saccharide is obtained by reacting propylene oxide with saccharose at a molecular ratio of about 80:1 at about 130° C. in the presence of about 1% potassium hydroxide by weight of saccharose as a catalyst.
4. The process of claim 1 wherein the reaction product is employed in admixture with an effective amount of a surface active polyglycol ether of an alkylphenol.
5. The process of claim 4 wherein the ratio of components in the mixture is about 8 parts by weight of the reaction product to 2 parts by weight of polyglycol ether of nonylphenol.

References Cited by the Examiner

UNITED STATES PATENTS

| 2,549,437 | 4/51 | De Groote et al. | 252—331 |
| 2,602,051 | 7/52 | De Groote | 252—331 |
| 2,748,088 | 5/56 | Monson | 252—321 |
| 2,920,047 | 1/60 | Hyatt et al. | 252—340 |
| 2,944,980 | 7/60 | De Groote et al. | 252—331 |
| 3,023,170 | 2/62 | Linn | 252—321 |
| 3,037,000 | 5/62 | Bannerman | 252—33 |

JULIUS GREENWALD, *Primary Examiner.*